United States Patent [19]

Jachimowicz

[11] 3,711,621
[45] Jan. 16, 1973

[54] MOISTURE BLOCK IN SHEATHED TELEPHONE CABLES

[75] Inventor: Ludwik Jachimowicz, Elizabeth, N.J.

[73] Assignee: General Cable Corporation, New York, N.Y.

[22] Filed: Feb. 18, 1971

[21] Appl. No.: 116,519

[52] U.S. Cl. ............... 174/23 R, 174/106 D;107
[51] Int. Cl. .................... H01b 7/18, H01b 7/28
[58] Field of Search ....... 174/23 R, 23 C, 25 C, 22 R, 174/20, 102 R, 102 D, 105 R, 106 R, 106 D, 107, 10

[56] References Cited

UNITED STATES PATENTS

| | | |
|---|---|---|
| 3,206,541 | 9/1965 | Jachimowicz.................174/105 R |
| 3,340,353 | 9/1967 | Mildner........................174/106 R |
| 3,538,235 | 11/1970 | Arendt et al...................174/23 C |
| 3,507,978 | 4/1970 | Jachimowicz.................174/105 R |

FOREIGN PATENTS OR APPLICATIONS

| | | | |
|---|---|---|---|
| 1,116,175 | 6/1968 | Great Britain | 174/23 R |
| 1,540,407 | 1/1970 | Germany | 174/23 R |

*Primary Examiner*—Bernard A. Gilheany
*Assistant Examiner*—A. T. Grimely
*Attorney*—Sandoe, Hopgood & Calimafde

[57] ABSTRACT

A powder that swells when it gets wet is placed in an electrical cable between the outer sheathing and the inner sheathing for double sheathed cables or between the sheathing and the core of single sheathed cables so that when and if the outer sheathing is perforated, and water that enters causes the powder to swell and to block the space under the sheathing so that water can not travel along the length of the cable under the sheathing. The powder remains dry as long as there is no perforation of the sheathing, and when dry the powder fills only a part of the space under the sheathing.

8 Claims, 7 Drawing Figures

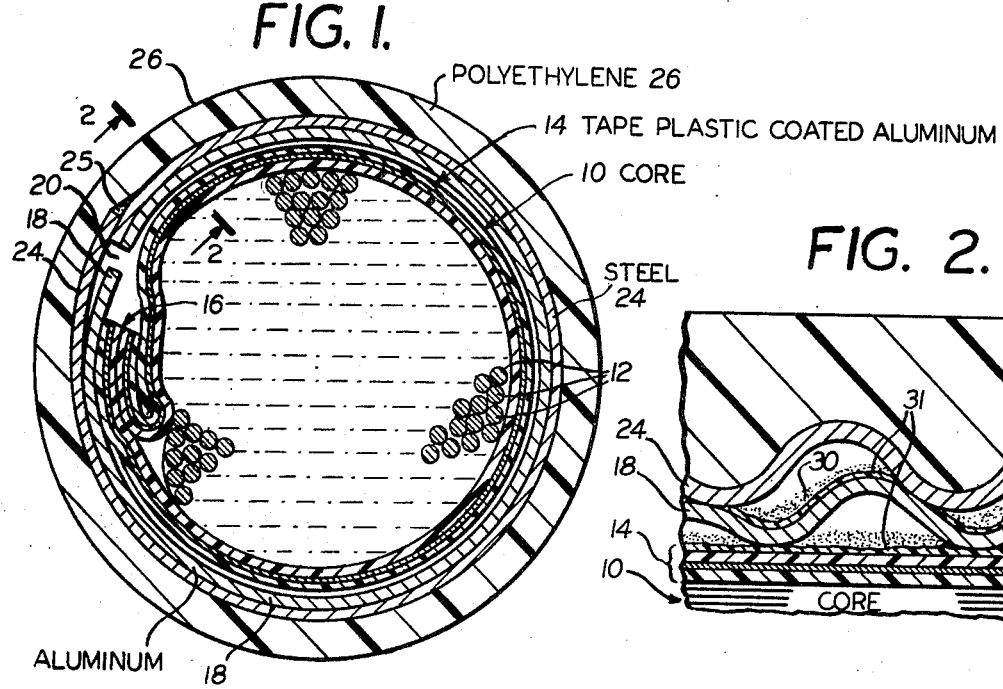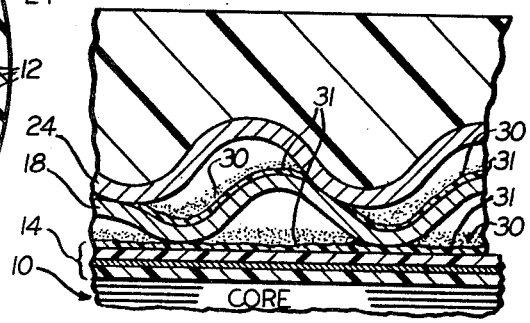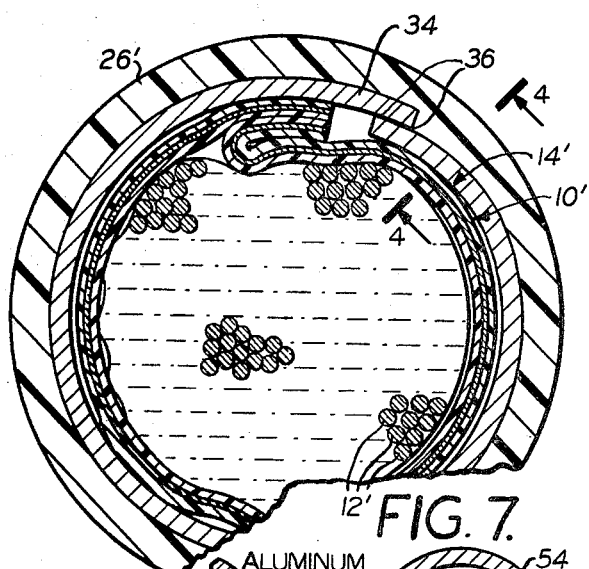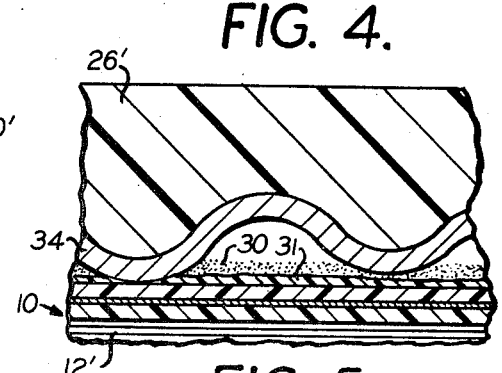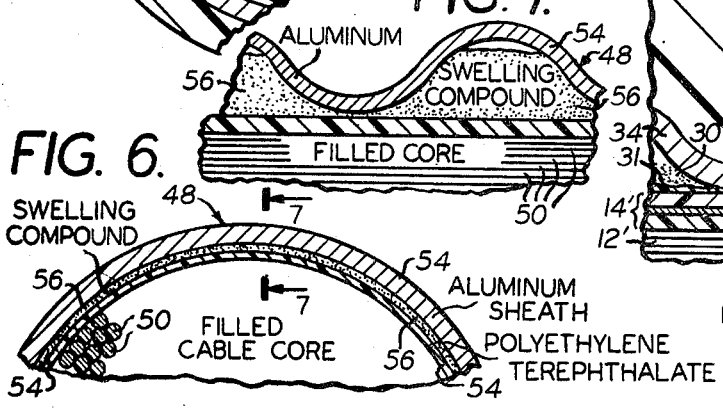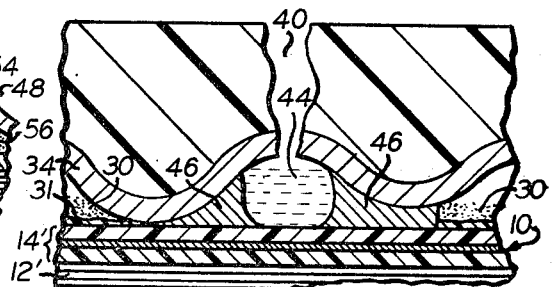

MOISTURE BLOCK IN SHEATHED TELEPHONE CABLES

BACKGROUND AND SUMMARY OF THE INVENTION

In all conventional cable constructions having an outer sheath and an inner sheath, a rupture or perforation of the outer sheath permits ground water to enter under the outer sheath and to migrate between the two sheaths. With conventional communications cable having a core covered by a single sheathing, perforation of the sheathing admits water into the space between the sheathing and the core. Such a migration of water is undesirable because in case of terrain incline, the water will run downhill and can penetrate a long distance down to the splice case and enter the splice if steps are not taken to seal properly passage between the splice case and the space under the outer sheathing.

Even if the proper precautions are taken at the splice case, it is still undesirable to expose to the water more than the absolute minimum of the cable length. For instance, when a repair to the sheathing is made, a short piece at the point of damage can be replaced. If water were prevented from migration along the space under the sheathing, then after repair the whole cable length would be sound. If, however, water is allowed to spread over a long distance, then the repair to a short section does not restore completely the soundness of the whole length.

Various plans have been used in the prior art to prevent such a migration of water under cable sheathing. One such plan was the use of "flooding compounds," such as asphalt and the like which fills the space, for instance between jute bedding and armor. By nature of its function it has to adhere to the surfaces it is flooding and this restricts the components from free movement in relation to each other and hence reduces the freedom of bending the cable. Where such a flooding compound would be used between two separate sheathings of a double sheathed cable, it would be difficult or impossible to unwind a cable from a reel.

The use of spaced moisture barriers within the cable has been suggested, but such barriers or plugs do not stay tight. They are objectionable because they reduce flexibility of the cable; and when they are tight, they form air-tight closures so that it is no longer possible to supervise or control the pressure gas in such a cable.

U.S. Pat. No. 3,347,974, issued Oct. 17, 1967, discloses the use of longitudinally spaced jelly moisture barriers which do not fill completely the space within the cables unless water enters the cables. If that occurs, and the barrier becomes wet, the jelly swells to form a plug.

It is an object of this invention to provide an improved cable construction for preventing migration of water along the length of an electrical cable in the event that sheathing becomes ruptured, or otherwise perforated. The present invention places dry material, such as powder, in the space between the sheathing or jackets. This material does not fill the space when the material is dry, but it swells to block migration of water if any water enters the cable and wets the material.

In the preferred construction, the dry material of this invention has the consistency of a powder which is substantially uniformly distributed around the circumference of the cable by applying it to a sticky surface of a core or sheath or by wrapping the cable with a tape impregnated with the powder. This powder does not decrease the flexibility of the cable but provides a lubricating effect between the sheaths, thus enhancing the flexibility of the cable.

There is further advantage to use of the dry powder in the space between the two sheathings if those sheathings are made in part or in whole of polyethylene. Many flooding compounds may affect adversely polyethylene sheathing, causing it to deform if the compound is applied hot. Barring this, the compounds may be absorbed by polyethylene oils, causing the polyethylene to swell and reducing jacket strength. Some may cause environmental stress cracking of polyethylene. The dry powder has none of these effects on polyethylene jackets, and when wetted, the powder will have the same effect as has the soil in which the cables are buried with no harm to polyethylene.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic, longitudinal, sectional view of an electrical cable made in accordance with this invention;

FIG. 2 is a sectional view taken on the line 1—1 of FIG. 1;

FIG. 3 is a view similar to FIG. 1 but showing a modified type of cable;

FIG. 4 is a sectional view taken on the line 4—4 of FIG. 3;

FIG. 5 is a view similar to FIG. 4 but showing the way in which the powder swells to form barriers to water flow lengthwise of the cable;

FIG. 6 is a fragmentary sectional view showing a filled communication cable with the powder of this invention between the core and the sheathing; and FIG. 7 is an enlarged, sectional view on the line 7—7 of FIG. 6.

DESCRIPTION OF PREFERRED EMBODIMENT

The cable shown in FIG. 1 includes a core 10 including separate conductors 12, each of which is preferably covered with insulation, usually polyethylene. The core 10 has a vapor-impervious jacket or sheath 14 that surrounds the group of conductors 12 and this sheath 14 can be made of metal foil, such as aluminum, coated on both sides with adherent polyethylene to prevent corrosion of the aluminum.

The jacket or sheath 14 has a longitudinal seam 16 formed by bending up the edges of the coated aluminum and bonding the confronting faces together. The turned-up edges are then bent over to give the sheath a substantially circular shape.

An aluminum strip 18 is folded longitudinally over the sheath or jacket 14. This aluminum strip 18 has a width somewhat less than the circumference of the jacket 14 so that the strip 12, when formed around the jacket 14, has an open seam 20. The aluminum strip may be corrugated and is so shown. A steel outer sheath 24 covers the aluminum strip 18. The outer sheathing is preferably formed by folding a steel strip around the cable with a longitudinal seam which is soldered at 25 to make the outer sheathing 24 impervious to moisture and ground water. The sheathing 24 is corrugated with corrugations that are substantially circumferential in order to increase the flexibility of the cable. A jacket 26 covers the steel 24.

The cable thus far described is a conventional cable and when the cable is flexed, there is relative movement of the outer jacket or sheathing 24 and the inner jacket or sheath 14 with respect to the aluminum strip 18 and to each other. Any flooding compound between the sheaths 14 and 24, and adhered to the sheaths, or on both sides of the aluminum strip 18, will obviously reduce the flexibility of the cable.

Cable made in accordance with this invention has powder 30, indicated by stippling in the drawing, on both sides of the aluminum strip 18. For best results there should be enough powder 30, distributed around the entire circumference of the cable, to swell and cut off water flow no matter at what angular location around the cable water enters. To maintain this distribution a carrier is used for the powder. In the drawing, coating 31 are applied to at least one of the surfaces of the space in which powder 30 is located and the coating 31 is a sticky material that holds powder 31 distributed around the circumference of the space.

Petrolatum jelly is a suitable carrier, but there must be enough powder to avoid having the jelly coat to powder particles to an extent that will prevent water penetration between coated particles. Good results are obtained with 3 to 5 parts petrolatum jelly to 1 part powder (by weight). Another suitable carrier that can be used is a woven or unwoven fibrous tape with the powder dusted on the tape which may be either sticky or non-adhesive. Any other suitable means for maintaining the powder distribution around circumference of the cable can be used. When using this substitute carrier, the same proportion of carrier to powder can be used as set forth above. Some powder can be loose in the space between the sheaths 14 and 24.

When gas under pressure is to be used between the sheaths 18 and 24, the thickness of the carrier 31 should not bridge the clearance between the inner and outer sheath. Even though some loose powder bridges the clearance between the inner and outer sheath at certain locations on some occasions, it ordinarily does not do so around the entire circumference since cables are laid in directions having a substantial horizontal component. When the cable is used with gas between the sheaths, the dry powder does not block passage of the gas or the maintenance of the gas pressure along the full length of the cable because even if some powder is piled up, it is a porous mass through which gas will permeate. The powdered material 30 and carrier 31 are applied to the space between the sheathing 18 and 24 in the course of manufacture of the cable. It is preferably distributed uniformly along the length of the cable, but the uniformity is not critical.

Various powders which swell when wetted are known. As examples of such powders, the invention can use Colloid WR-1 or WR, which are organic compounds, or Polyhall 295, which is a synthetic compound, these powders being supplied by Stein, Hall & Co., New York, N.Y. Stein, Hall & Co. can supply powder to anyone engaged in the manufacture of the cable of this invention. When these materials are used, the amount inserted between the inner and outer sheaths should not occupy more than 30 percent to 60 percent of the available cross section of the spacing between the inner and outer sheath; but for particular powders the amount of material must be correlated with its swelling characteristics so that when wet, it will fill the space and develop enough pressure to stop migration of water along the clearance between the inner and outer sheathing. Many other solid dry materials which can be powdered and which swell in the presence of water are known and can be used. For example, a number of such powders are disclosed in U.S. Pat. No. 3,538,235, issued Nov. 3, 1970.

FIG. 3 shows another conventional type of electrical cable with parts that correspond to the cable of FIG. 1 indicated by the same reference character with a prime appended. The cable of FIG. 3 has a core 10' including insulated conductors 12' and a moisture and water-impervious sheathing 14'. An outer sheath 34, made of corrugated aluminum, is applied directly over the inner sheathing 14' and has a longitudinal seam sealed by plastic sealant 36 or left unsealed. A plastic jacket 26' is extended over the metal sheathing as in FIG. 1. This plastic jacket may be made of polyethylene and in both FIGS. 1 and 3 it can be considered part of the outer sheathing. Powder 30 and a carrier 31 are dispersed along the cable in the clearance between the inner sheath 14' and the outer sheath 34.

FIG. 5 shows the outer plastic jacket 26' and the metal 34 pierced at a location 40 so that water 44 has entered the space between the outer sheath and the inner sheath 14'. The powder 30 has swelled to form barriers 46 on both sides of the location 40 where the outer sheath leaks. The water 44 is shown occupying a space of substantial radial extent in order to emphasize the operation of the swollen powder in preventing flow of water in either direction longitudinally in the space between the sheathings.

It will be understood that this invention can also be used for electrical cables in which both the inner and outer sheath are made of plastic, or on any electrical cable which has an inner and outer sheath or jacket constructed so that there is danger of migration of water along the length of the cable between the inner and outer sheath in the event that the outer sheath becomes perforated.

FIG. 6 shows a communication cable 48 which has a core made up of insulated conductors 50 surrounded by a plastic dielectric tape 52. The cable core is preferably a filled cable core.

This core is enclosed in an aluminum sheath 54 which is preferably coated to resist corrosion and corrugated for greater flexibility. There is space between the aluminum sheath 54 and the tape 52 which forms the outside of the cable core. This space is partially filled with powder 56 that swells when it becomes wet to form a liquid seal between the core and the sheath for preventing migration of water lengthwise of the cable in the event that the sheath becomes punctured or otherwise perforated after installation.

In order to maintain sufficiently uniform distribution of the powder around the circumference of the core, the powder 56 may be adhesively connected with the outside surface of the tape 56 in the same manner as previously described for the cables shown in the other figures.

The cable shown in FIGS. 6 and 7 is a filled cable, and such cables are made with a dielectric sheath around the filled core and with for 10 to 30 mils of filler applied over the core tape to fill the space between the core and the aluminum, which may be corrugated. The core sheath may be made of polyethylene terephthalate which supplies the necessary dielectric strength between the conductors 50 and the shield 54. A layer of filling compound applied over the dielectric shielding tape 56 prior to the application of the aluminum sheath, can have the powder 56 mixed with it as a carrier to provide the expanding feature of this invention. In order to hold the powder evenly distributed around the circumference of the cable, it is preferably distributed through a carrier, as previously explained. If this carrier is petrolatum jelly, then it is preferably applied to the dielectric shield in sufficient thickness so that when the corrugated aluminum shield is placed over the dielectric shield, the petrolatum jelly with the powder distributed through it is displaced upwardly in the corrugations, as shown in FIG. 7. What space is left above the sealing compound is empty until the sealing compound has contact with water and increases in volume to substantially fill the space in each corrugation.

The preferred embodiments of the invention have been illustrated and described, and the invention is defined in the appended claims.

What is claimed is:

1. An electrical cable including a core having conductors therein and having an inner sheath surrounding the conductors, an outer sheath surrounding the inner sheath and having some clearance between the sheaths along which ground water could migrate lengthwise of the cable in the event of a rupture or other perforation of the outer sheath, powder made of material that swells when wetted with water, the powder being distributed along the length of the cable and confined in said clearance between the sheaths, the quantity of powder being correlated with its swelling characteristics to fill the clearance, when the powder is contacted by water, with enough pressure to stop the flow of water in said clearance and lengthwise of the cable.

2. The electrical cable described in claim 1 characterized by the powder, when dry, filling only part of the clearance between the sheaths, and the powder being distributed continuously along the length of the cable which is to be protected against the migration of water between the sheaths.

3. The electrical cable described in claim 2 characterized by the clearance space between the sheaths containing powder in an amount that fills the space to an extent not greater than 30 percent to 60 percent of the volume of said space when the powder is dry.

4. The electrical cable described in claim 2 characterized by the outer sheath being a corrugated metal sheath having a seam sealed against penetration by water, the inner sheath being of smoother contour than the corrugated sheath in the direction of the length of the cable whereby the clearance between the sheaths varies across the corrugations, the powder being distributed between the sheaths along the length of the cable and with the powder filling the average clearance between the corrugated sheath and the smoother inner sheath to an extent not greater than 30 percent to 60 percent of the volume of said clearance.

5. The electrical cable described in claim 4 characterized by the outer sheath having a welded longitudinal seam.

6. The electrical cable described in claim 2 characterized by the outer sheath being a metal sheath with a seam sealed against penetration by water, an intermediate inner sheath between the outer sheath and said inner sheath surrounding the conductors, the intermediate inner sheath having an unsealed seam, said inner sheath surrounding the conductors being sealed against water penetration, the powder being distributed along the cable between the outer and said inner sheath surrounding the conductors and on both the inside and outside of the intermediate inner sheath.

7. The electrical cable described in claim 6 characterized by the outer sheath being a corrugated steel sheath with generally circumferential corrugations for greater flexibility and with a welded longitudinal seam, and the intermediate inner sheath being a longitudinally folded aluminum sheath having an unsealed seam, and said inner sheath surrounding the conductors being a mostly plastic sheath impervious to water.

8. The electrical cable described in claim 2 characterized by at least some of the powder being held against longitudinal and circumferential displacement in the space between the inner and outer sheaths by being bonded to a surface of at least one of the sheaths, the bonded powder filling only a part of the clearance between the inner and outer sheaths.

* * * * *